United States Patent [19]

Zak

[11] Patent Number: 5,166,847
[45] Date of Patent: Nov. 24, 1992

[54] REDUCED STICK/SLIP LOAD ARM ASSEMBLY HAVING A COATING WITH A LOW FRICTIONAL COEFFICIENT

[75] Inventor: Brian S. Zak, Bloomington, Minn.

[73] Assignee: Seagate Technology, Inc., Scotts Valley, Calif.

[21] Appl. No.: 758,384

[22] Filed: Sep. 3, 1991

Related U.S. Application Data

[63] Continuation of Ser. No. 504,955, Apr. 5, 1990.

[51] Int. Cl.$^5$ .......................... G11B 5/48; G11B 21/21
[52] U.S. Cl. ...................................... 360/104; 360/103
[58] Field of Search ................ 360/104, 105, 103, 102

[56] References Cited

U.S. PATENT DOCUMENTS

| | | | |
|---|---|---|---|
| 3,705,397 | 12/1972 | Gerkema | 360/103 |
| 3,984,872 | 10/1976 | Beecroft | 360/105 |
| 4,143,409 | 3/1979 | Iwabuchi et al. | 360/105 |
| 4,167,765 | 9/1979 | Watrouss | 360/104 |
| 4,197,566 | 4/1980 | Suzuki et al. | 360/103 |
| 4,291,350 | 9/1981 | King et al. | 360/104 |
| 4,327,387 | 4/1982 | Plotto | 360/103 |
| 4,651,245 | 3/1987 | Kanno | 360/105 |
| 4,661,872 | 4/1987 | Saito | 360/104 |
| 4,740,854 | 4/1988 | Shibuya et al. | 360/104 |
| 4,807,070 | 2/1989 | Isozaki et al. | 360/104 |
| 4,819,094 | 4/1989 | Oberg | 360/104 |
| 4,831,479 | 5/1989 | Noguchi et al. | 360/105 |
| 4,835,640 | 5/1989 | Endo et al. | 360/103 |
| 4,841,396 | 6/1989 | Kawasaki | 360/104 |
| 4,863,809 | 9/1989 | Brar et al. | 360/102 |
| 4,868,694 | 9/1989 | Hagen | 360/104 |

FOREIGN PATENT DOCUMENTS 2-239481 9/1990 Japan .

Primary Examiner—John H. Wolff
Assistant Examiner—Craig A. Renner
Attorney, Agent, or Firm—Kinney & Lange

[57] ABSTRACT

A load arm assembly for a disk drive including a load beam, a head for communicating with a recording medium, and a gimbal spring interconnecting the head and the load beam. The interconnection includes a pivot having a first contact surface in point contact with a second contact surface. In accordance with the present invention, a coating is applied to at least one of the first and second contact surfaces and has a low frictional coefficient for reducing the friction between the first and second contact surfaces.

8 Claims, 5 Drawing Sheets

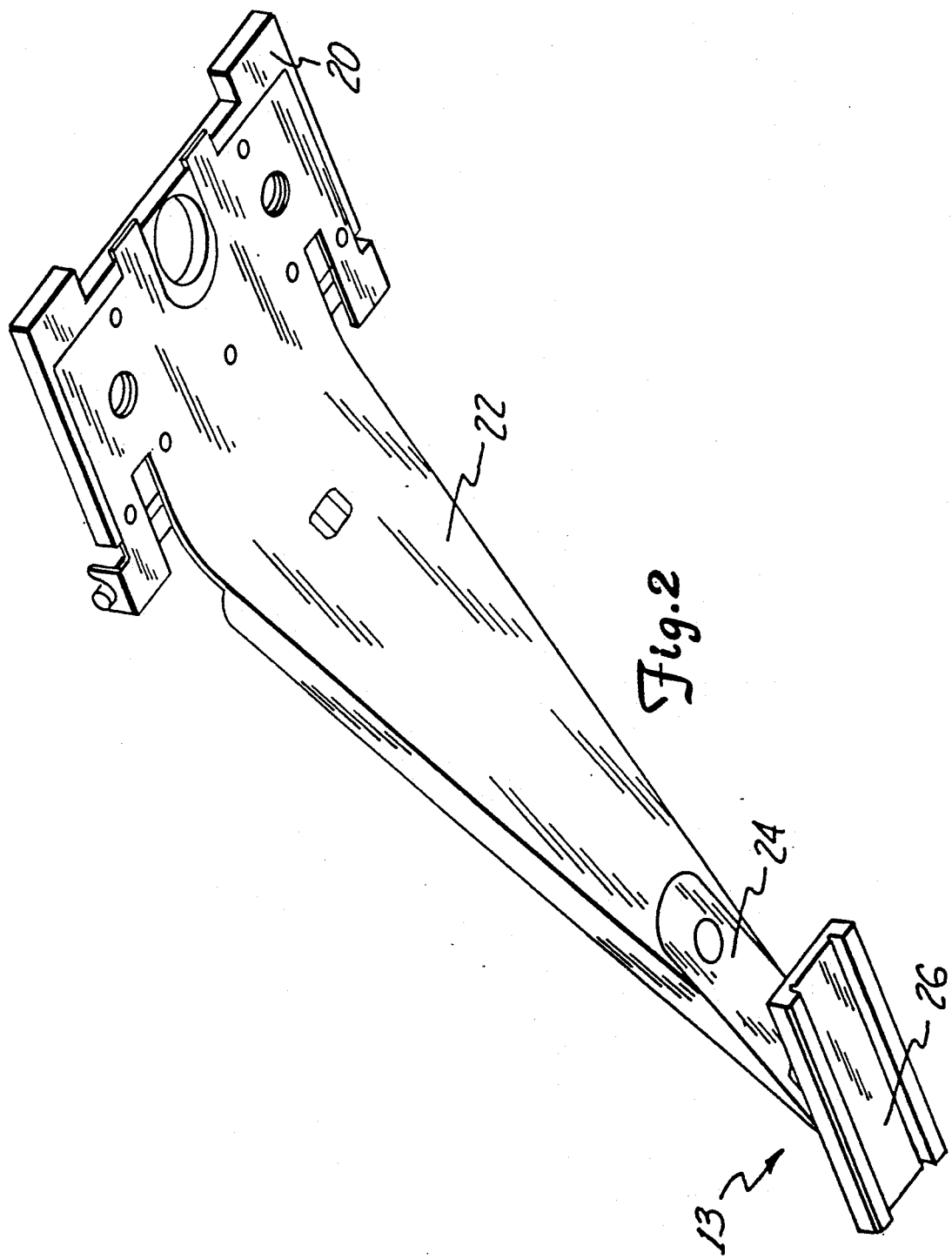

REDUCED STICK/SLIP LOAD ARM ASSEMBLY HAVING A COATING WITH A LOW FRICTIONAL COEFFICIENT

This is a continuation of application Ser. No. 07/504,955 filed on Apr. 5, 1990, abandoned as of the date of this application.

BACKGROUND OF THE INVENTION

The present invention relates to the interface between a gimbal spring pivot and a load arm in a magnetic disk drive. More specifically, this invention relates to a modification of a bearing surface between the load arm and the gimbal pivot.

Within a disk drive, a load arm supports a head relative to a rotating magnetic disk. The head includes a slider carrying at least one magnetic transducer. The magnetic transducer communicates with individual bit positions on a specified data track within the disk.

A gimbal spring is positioned between the load arm and the slider. The gimbal spring resiliently supports the slider and allows it to move vertically and to pitch and roll about a pivot while the slider follows the topography of the rotating disk.

Magnetic disk drives have traditionally suffered from radial off track errors. These errors occur when the magnetic transducer is not aligned with the correct data track on the magnetic disk. If the transducer is off track, extraneous magnetic fields can be read from adjacent data tracks causing read errors. Analogous radial off track errors, in the form of incorrectly written data, can occur during a write cycle.

A source of radial off track errors is a phenomena referred to in the art as "stick/slip." During read and write cycles, the load arm pivots to position the magnetic transducer over a desired track. The slider laterally accelerates and decelerates during each cycle. The gimbal pivot and the load arm change relative positions due to the dynamic forces on the slider during the cycle. This is known as "slip". On a random basis, the gimbal pivot sticks in the shifted ("slipped") position relative to the load arm and does not return to its original position. This "stick" is caused by the friction between the load arm and the gimbal pivot. A measure of this friction is the frictional coefficient. Since the position of the magnetic transducer is so important, any lateral shift in the slider-gimbal assembly with respect to the load arm may result in radial off track errors.

Suzuki et al U.S. Pat. No. 4,197,566 discloses one attempt at reducing off track errors caused by shifting contact positions between a pivot and a supporting lever for a slider body. Suzuki et al provides first and second gimbal springs disposed about a pivot. Adverse forces near the contact point are reduced to inhibit shifting of contact positions. The configuration shown in Suzuki reduces the "slip" at the expense of added gimbal spring complexity and manufacturing costs.

The prior art lacks a simple method of eliminating radial off track errors caused by the "stick/slip" phenomena.

SUMMARY OF THE INVENTION

The present invention provides a load arm assembly which significantly reduces radial off track data errors caused by the stick/slip phenomena. The load arm assembly includes a load beam, a head for communicating with a recording medium, and a gimbal spring. The gimbal spring interconnects the head and the load beam. The interconnection includes a pivot having a first contact surface in point contact with a second contact surface. The pivot allows the head to pitch and roll about the contact point while following the topography of a rotating magnetic disk.

In accordance with the present invention, a coating is applied to at least one of the first and second contact surfaces. The coating has a low frictional coefficient for reducing friction between the first and second contact surfaces. In a preferred embodiment, the pivot formed by the gimbal spring is in point contact with the load beam. The coating may be applied to the tip of the load beam at the contact point to create a smooth contact surface.

Alternatively, or additionally, the coating may be applied to the gimbal pivot.

BRIEF DESCRIPTION OF THE DRAWINGS

FIG. 2 is a perspective view of the load arm and the slider-gimbal assembly, as viewed from beneath the load arm in FIG. 1.

DETAILED DESCRIPTION OF THE PREFERRED EMBODIMENTS

Figure 1:
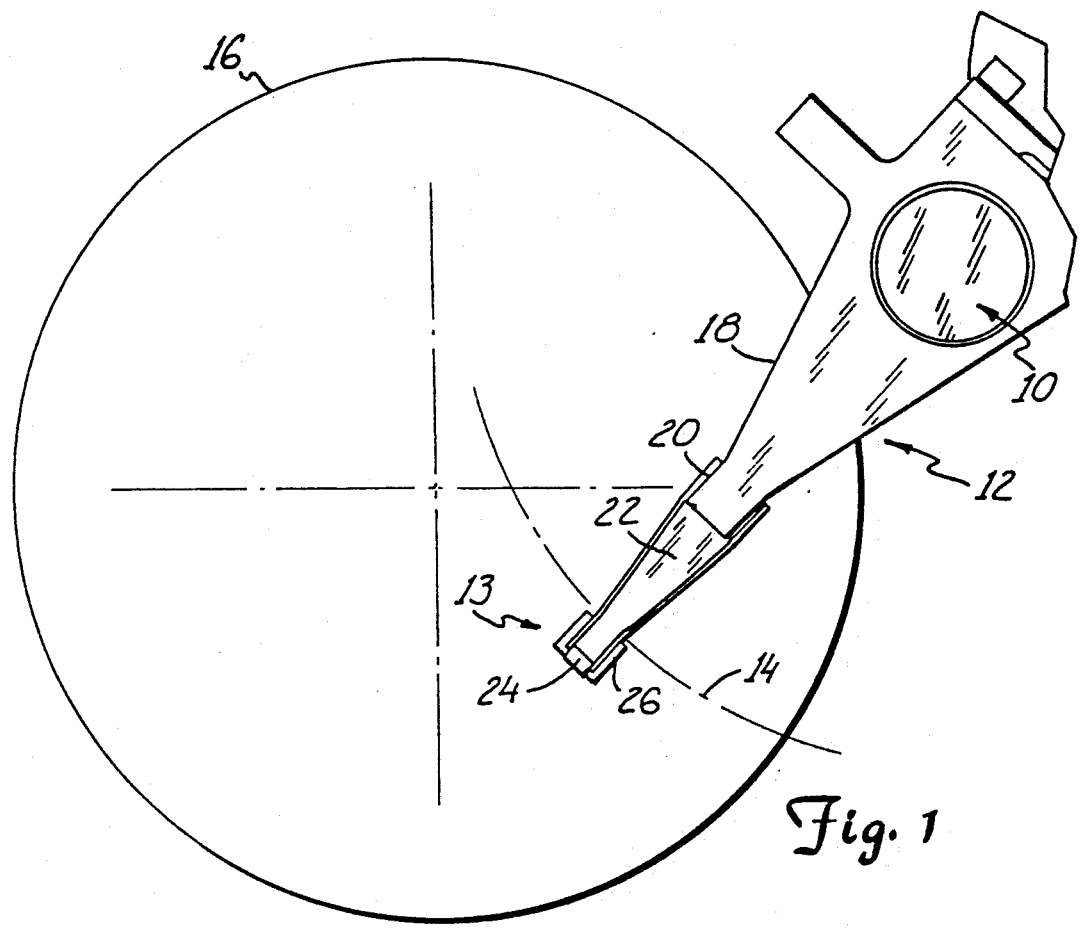
FIG. 1 is a plan view of a load arm supporting a slider-gimbal assembly over a magnetic disk.

FIG. 1 illustrates an actuator 10 and an actuator arm 12 which supports a slider-gimbal assembly 13 over a magnetic disk 16. The actuator 10 positions the arm 12 along an arc 14 over the magnetic disk 16. The arm 12 includes a supporting arm 18, a base plate 20, and a load arm 22. The slider-gimbal assembly 13 includes a gimbal spring 24 and a slider 26. The arm 12 is known as a rotary actuating arm because the actuator 10 rotates the arm 12 to position the slider 26 along the arc 14.

FIG. 2 is a perspective view of the load arm 22 supporting the slider-gimbal assembly 13, as viewed from beneath the load arm 22 in FIG. 1. The gimbal spring 24 resiliently supports the slider 26 over the disk 16. As the disk 16 rotates, the slider 26 flies above the surface of the disk 16. The gimbal spring 24 allows the slider 26 to pitch and roll while slider 26 follows the topography of the disk 16.

Figure 3:
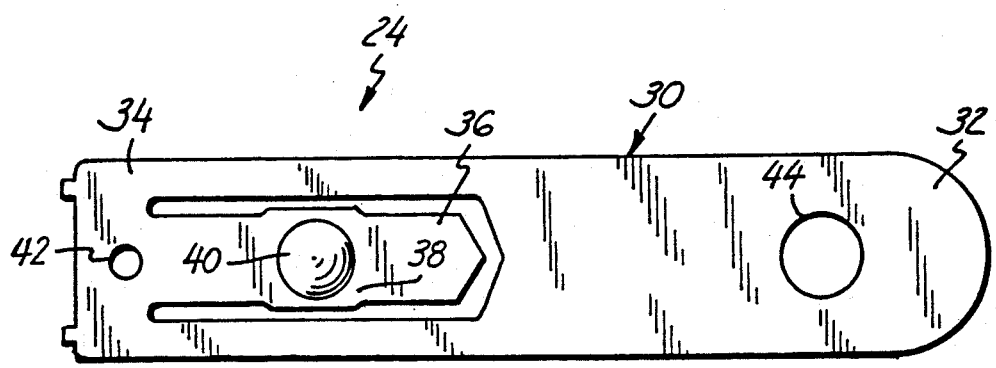
FIG. 3 is an enlarged plan view of a gimbal spring that may be employed in the practice of the present invention.

FIG. 3 is an enlarged plan view of the gimbal spring 24 which includes a resilient, elongated member 30 having a rearward portion 32 and a forward portion 34.

A cantilevered tongue 36 is cut from a central region of the forward portion 34. The tongue 36 includes a central pad 38. A pivot 40 is formed from the central pad 38 for point contact with the load arm 22 (shown in FIG. 5). Apertures 42 and 44 are provided for aligning the gimbal spring 24 with the load arm 22.

Figure 4:
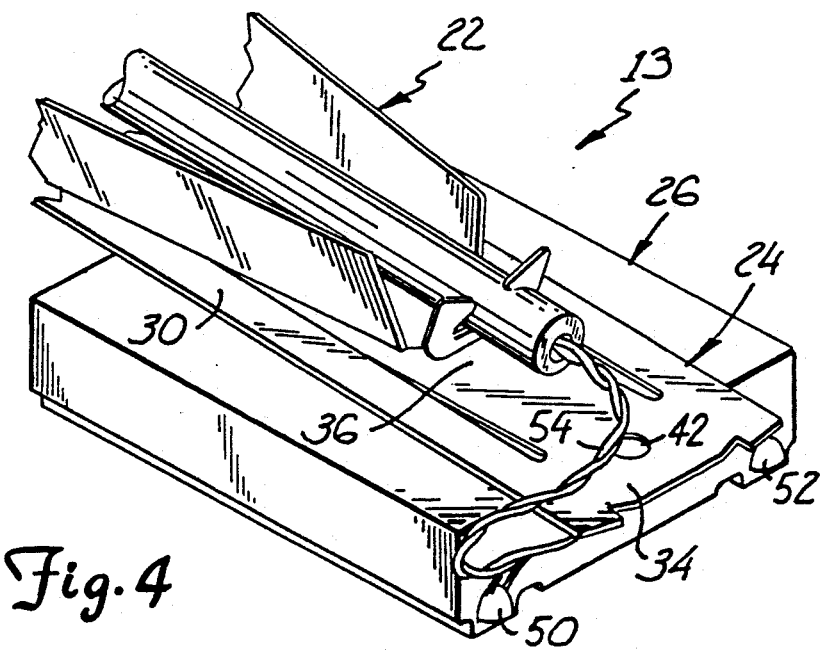
FIG. 4 is an enlarged perspective view of a load arm supporting a slider-gimbal assembly.

FIG. 4 is an enlarged perspective view of the load arm 22 which supports the slider-gimbal assembly 13. The gimbal spring 24 includes the elongated member 30, forward portion 34, tongue 36, and the aperture 42. The load arm 22 is secured to the elongated member 30. The slider 26 is adhesively connected to the tongue 36 and carries the magnetic transducers 50 and 52. The transducers 50 and 52 communicate with individual data bit locations within data tracks (not shown) on the magnetic disk 16. Electrical leads 54 provide electrical signals to the transducers 50 and 52 for performing read and write operations on the disk 16. During operation, the actuator 10 rotates the arm 12 along the arc 14 to position either the transducer 50 or 52 over a desired data track on the disk 16 (shown in FIG. 1).

Actuation (by actuator 10, see FIG. 1) is performed prior to every read and write operation. Accurate positioning of the transducers 50 and 52 is critical to disk performance. If the transducer 50 or 52 is not positioned correctly over the desired data track, extraneous magnetic fields can be read from adjacent data tracks causing read errors. Analogous errors, in the form of incorrectly written data, can occur during a write cycle. These errors are called radial off track errors.

Figure 5:
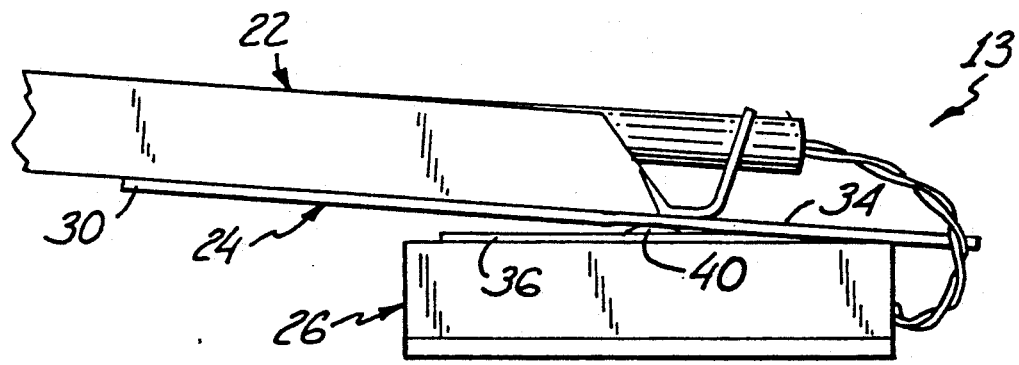
FIG. 5 is a view in side elevation of a load arm and a slider-gimbal assembly.

FIG. 5 is a side elevation view of the load arm 22 and the slider-gimbal assembly 13. The slider-gimbal assembly 13 includes the slider 26 and the gimbal spring 24. The elongated member 30 of the gimbal spring 24 is secured to the load arm 22 in a known manner. The slider 26 is typically secured to the tongue 36 by an adhesive connection. When the slider-gimbal assembly 13 is secured to the load arm 22, the pivot 40 forces the tongue 36 and the slider 26 downward and into a "loaded" position. In the loaded position, the pivot 40 provides a surface about which the slider 26 can pitch and roll while it follows the topography of the disk 16.

Figure 6:
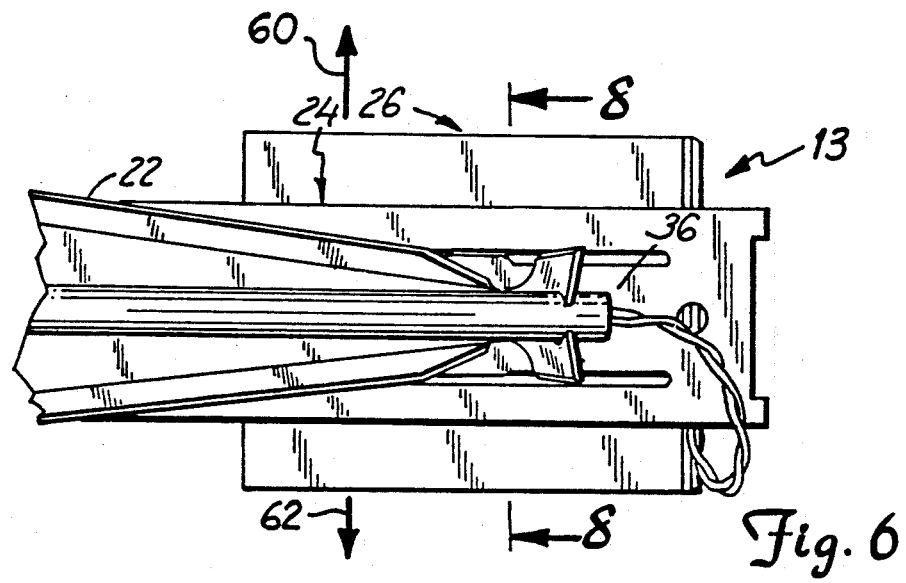
FIG. 6 is a top plan view of the load arm and the slider-gimbal assembly of FIGS. 1-5.

FIG. 6 is a top plan view of the slider-gimbal assembly 13 secured to the load arm 22. The slider-gimbal assembly 13 includes the slider 26 and the gimbal spring 24. The gimbal spring 24 includes the tongue 36.

A source of radial off track errors is a phenomena referred to in the art as "stick/slip". During actuation, the slider 26 laterally accelerates and decelerates. The pivot 40 and the load arm 22 change relative positions due to the dynamic forces on the slider 26 during actuation (indicated by arrows 60 and 62 in FIG. 6). This is known as the "slip". On a random basis, the pivot 40 sticks in a shifted position relative to the load arm 22 and does not return to its original position. The "stick" is caused by friction between the load arm 22 and the pivot 40. A measure of this friction is the frictional coefficient. Since the position of the transducers 50 and 52 are so important, any lateral shift of the slider 26 with respect to the load arm 22 may result in radial off track errors.

The static force balance equation of the slider-gimbal assembly is given by Equation 1.

$$N_F u = d K_x \qquad \text{Equation 1}$$

Where:

$N_F$ = the normal gram load force applied to the gimbal pivot in the loaded position;

u = frictional coefficient between the pivot and the load arm;

d = distance of off track error; and $K_x$ = radial gimbal stiffness.

Rearranging Equation 1 provides a measure of the magnitude of the off track error as a function of the frictional coefficient (Equation 2).

$$d = \frac{N_F u}{K_x} \qquad \text{Equation 2}$$

Equation 3 provides an analysis for a typical slider-gimbal assembly.

$$d_1 = \frac{[(9.5 \text{ gm}/454 \text{ gm/lb.}) (0.9)]}{90 \text{ lb/inch}} = 209 \text{ micro-inches} \qquad \text{Equation 3}$$

The present invention reduces the frictional coefficient between the load arm 22 and the pivot 40. This allows the slider 26 to return to its original position after a lateral shift in position with respect to the load arm 22. In the original position, the transducers 50 and 52 are accurately positioned for reading and writing.

Figure 7:
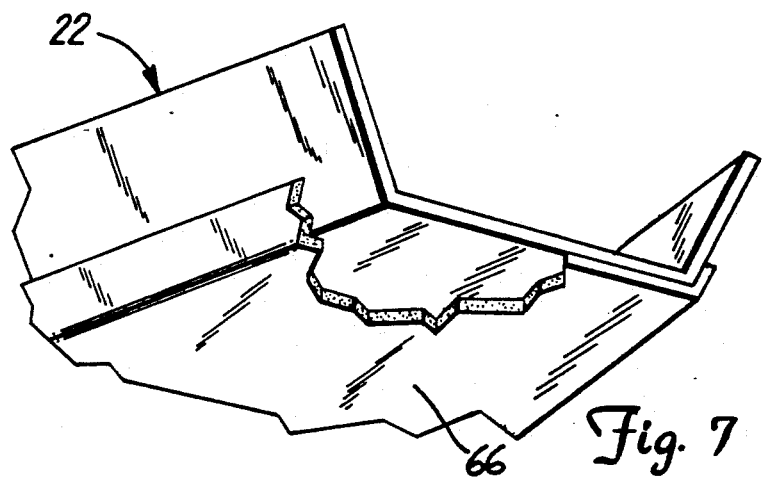
FIG. 7 is an enlarged perspective view of a load arm illustrating an applied coating with portions of the coating broken away.

FIG. 7 is an enlarged perspective view of the load arm 22 having an applied coating 66. Portions of the coating 66 are broken away for illustration. The coating 66 provides an interface with a lower frictional coefficient. In a preferred embodiment, a material is sputtered onto the tip of the load arm 22 where it contacts the pivot. The material is chosen for its low frictional coefficient and for its durability. An example of such a material is polytetrafluoroethylene (PTFE). The coating 66 preferably has a thickness from approximately 10 micro-inches to approximately 100 micro-inches. The thickness requirements vary with material types and physical requirements. It should be understood that any coating thickness is contemplated by the present invention. A variety of materials may be used as a coating. In addition, a variety of application techniques may be used.

As an alternative to sputtering, the tip of load arm 22 may be dipped in an electroless material, and through the process of electroless plating the coating 66 is formed having a uniform thickness. An example of an electroless material is nickel/PTFE. However, other materials may also be used. A preferable coating thickness is about 100 micro inches for electroless material.

A further alternative to sputtering is the process of molecular effusion in which free molecules of a selected material are transferred into pores within the load arm 22 to create a dry film lubricant coating on the surface of the load arm tip. An example of such a material is a modified tungsten disulfide made by Future Trend Industries and sold under the trademark of Dicronite.

Figure 8:
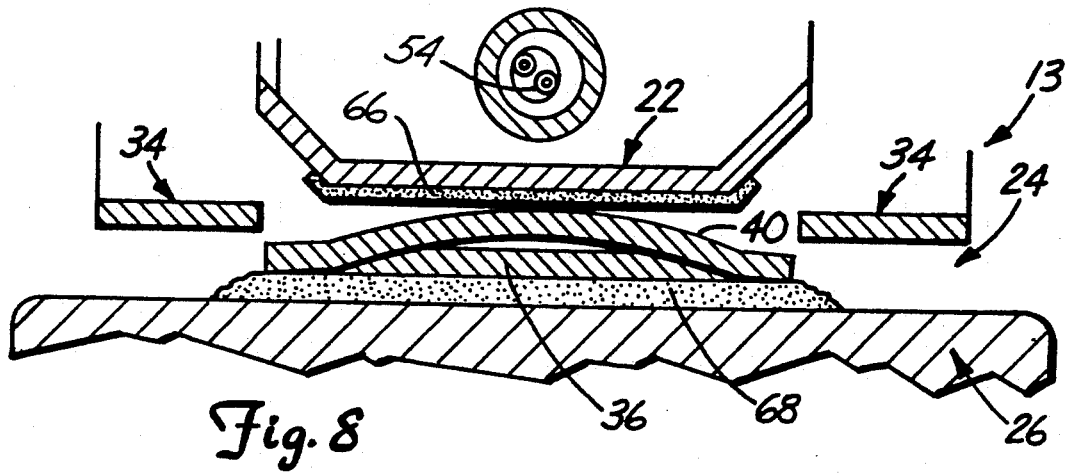
FIG. 8 is a sectional view of the load arm and the slider-gimbal assembly taken along line 8—8 of FIG. 6.

FIG. 8 is a sectional view of the load arm 22 and the slider-gimbal assembly 13 taken along line 8—8 of FIG. 6. The slider-gimbal assembly 13 includes the gimbal 24 and the slider 26. The slider 26 is secured to the gimbal 24 by an adhesive 68. The coating 66 is applied to the load arm 22 and provides an interface between the load arm and the pivot 40 with a low frictional coefficient. The interface creates a smooth bearing surface that reduces radial off track errors caused by the stick/slip phenomena by reducing the stick.

Equation 4 provides a static force balance analysis for an interface having a PTFE sputter or electroless nickel/PTFE coating with a frictional coefficient of 0.05.

$$d_2 = \frac{[(9.5 \text{ gm}/454 \text{ gm/lb.}) (0.05)]}{90 \text{ lb/inch}} = 12 \text{ Micro inches} \quad \text{Equation 4}$$

The coating reduces the radial off track error from about 209 micro inches (Equation 3) to about 12 micro inches. Accuracy of transducer positioning is thereby increased by a significant margin. Random errors due to the stick/slip phenomena become very rare, if not entirely eliminated.

Figure 9:
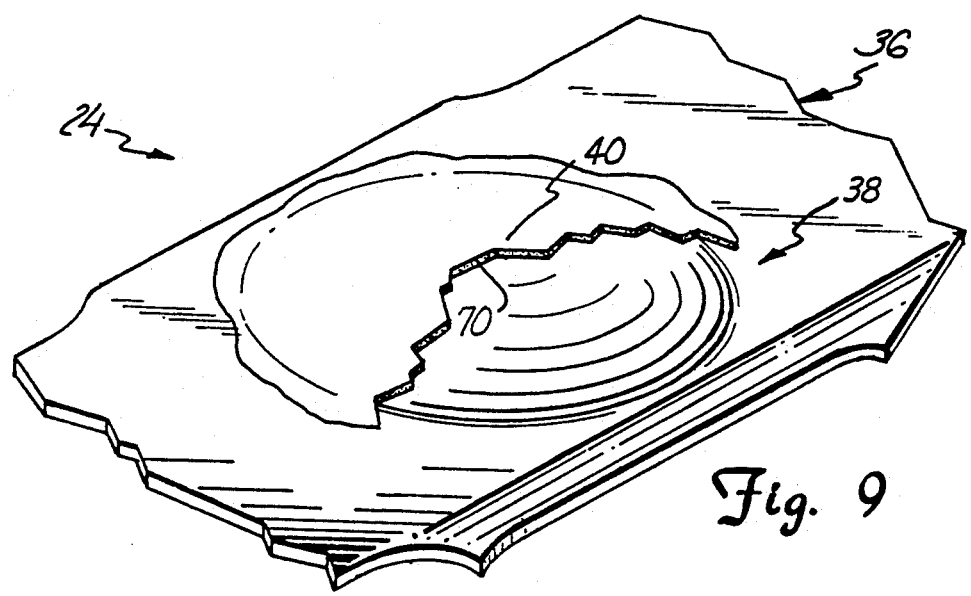
FIG. 9 is a greatly enlarged fragmentary detail of a portion of the gimbal spring of FIG. 3 illustrating an alternative embodiment in which the coating is applied to a gimbal pivot.

FIG. 9 is a greatly enlarged fragmentary detail of a portion of the gimbal 24 of FIG. 3 illustrating an alternative embodiment in which a coating 70 is applied to the pivot 40. Portions of coating 70 are broken away for illustration.

Figure 10:
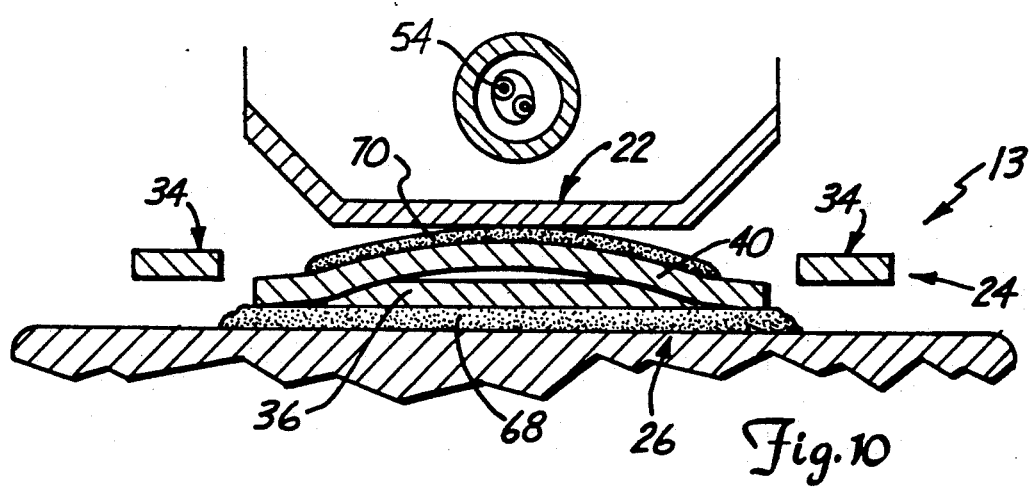
FIG. 10 is a sectional view of the load arm and the slider-gimbal assembly taken along line 8—8 of FIG. 6 and illustrating the alternative embodiment of FIG. 9.

FIG. 10 is a sectional view of the load arm 22 and the slider-gimbal assembly 13 taken along line 8—8 of FIG. 6 and further illustrating the alternative embodiment of FIG. 9. The slider 26 is secured to the gimbal 24 by the adhesive connection 68. The coating 70 is applied to the pivot 40 and provides a smooth bearing surface between the pivot and the load arm 22.

The present invention provides a simple, inexpensive solution to the problem of radial off track errors caused by the stick/slip phenomena. In the prior art, solutions were quite complicated and involved more elaborate gimbal structures. Those solutions were therefore costly and difficult to manufacture. The present invention eliminates the drawbacks found in the prior art solutions.

Although the present invention has been described with reference to preferred embodiments, workers skilled in the art will recognize that changes may be made in form and detail without departing from the spirit and scope of the invention. For example, the coating of the present invention may be used on a linear actuator. The linear actuator positions the transducer along a linear axis from the center of the disk to its outer edge. Also, as noted above, a coating in accordance with the present invention maybe applied to one or both of the interface surfaces of the gimbal point contact.

What is claimed is:

1. A load arm assembly for a disk drive comprising:
   a load beam having a first contact surface;
   a slider which carries a transducer for communicating with a recording medium;
   a gimbal spring interconnecting the slider and the load beam in a normally unshifted position, with a second contact surface in a point contact with the first contact surface, wherein one of the first and second contact surfaces includes a pivot at the point contact about which the gimbal spring allows the slider to pitch and roll; and
   a low-friction coating adhered to at least one of the first and second contact surfaces at the point contact for reducing friction between the first and second contact surfaces to allow the point contact to return to the unshifted position after lateral acceleration and deceleration of the slider.

2. The load arm assembly of claim 1 wherein the coating includes polytetrafluoroethylene (PTFE) which is sputtered onto at least one of the first and second contact surfaces.

3. The load arm assembly of claim 2 wherein the coating has a thickness of approximately 10 micro-inches to approximately 100 micro-inches.

4. The load arm assembly of claim 1 wherein the coating includes an electroless material overcoat which is applied to at least one of the first and second contact surfaces by a process of electroless plating.

5. The load arm assembly of claim 4 wherein the electroless material overcoat has a thickness of approximately 10 micro-inches to approximately 100 micro-inches.

6. The load arm assembly of claim 1 wherein the coating is applied to the first contact surface.

7. The load arm assembly of claim 1 wherein the coating is applied to the second contact surface.

8. The load arm assembly of claim 1 wherein the coating is applied to the first contact surface and the second contact surface.

* * * * *